UNITED STATES PATENT OFFICE.

FREDK. W. GOESSLING, OF JERSEY CITY, NEW JERSEY.

IMPROVED PROCESS FOR MAKING SIRUP AND SUGAR FROM INDIAN CORN OR OTHER GRAIN.

Specification forming part of Letters Patent No. 49,749, dated September 5, 1865.

*To all whom it may concern:*

Be it known that I, FREDERICK W. GOESSLING, now of Jersey City, in the county of Hudson and State of New Jersey, have invented a new and Improved Method or Process of Manufacturing a Cane-like Sirup and Sugar from Indian Corn or Maize, which method or process is also applicable to all grains or cereals which contain amylum; and I do hereby declare that the following is a full and exact description thereof, sufficient to enable others skilled in the art to which it belongs to manufacture sugar and sirup according to the principles of my said invention and improvement.

*First degree.*—In the first place, I take about three thousand pounds (3,000 lbs.) of Indian corn or maize (or other cereals containing amylum) and soak it in a suitable tank or vat in a caustic-alkali liquid of about one and one-half degree specific gravity for about one week. Then I take this soaked corn or grain and crush it in suitable mills or rollers, and then sift this crushed mass of grain or maize in suitable sieves, and the milky substance which passes through the sieves I put into other tank or tanks, and wash it by agitation in a weak alkaline water, and then allow it to settle, and then draw off the top liquid, and then wash it again in pure soft water, and then draw off the top liquid, leaving the milky mass at the bottom of the tank or vat. This milky mass is not commercial starch. It will and must have an alkali taste, (only sufficient to turn red bitmus paper blue.) This constitutes the first degree or first step in my process.

*Second degree.*—I now have prepared and ready for use another suitable tank or vat, in which there is placed a lead pipe, running back and forth over the bottom of the tank, or in the form of a coil, one end of which lead pipe is connected with an iron pipe outside of the tank, and which iron pipe is connected with a steam-boiler, and the other end of the lead pipe is carried up out of the tank and opens into a barrel outside. Suitable stop-cocks are placed in this lead pipe to regulate and control the passage of steam through it. Into this tank or vat I put about two hundred pounds of pure soft water and about twenty-four (24 lbs.) of sulphuric acid. Then I pass steam through this lead pipe, causing the acid-water in the tank to boil. Then I mix with the milky substance (before described in the first degree of my process) so much pure soft water as will reduce it to the consistency of thin sirup. Then I pass this milky substance into the boiling acid-water above mentioned so slowly and gradually as will not stop the boiling, and after it is all in I keep it slowly to the boiling-point for about six hours. Then I shut off the steam and stop the boiling, and add to the boiled mass about ten pounds (10 lbs.) of fine pulverized animal (or lichen) carbon or its equivalent, (animal carbon being used by preference,) and then add very gradually about thirty pounds (30 lbs.) of fine pulverized carbonate of lime. This may be added dry or mixed with water, and in addition thereto I may use about three per cent. of prepared carbonate of quicklime. Thereby the whole mass becomes thoroughly neutralized. After the neutralization, as aforesaid, I put into the mass about twenty pounds more of fine pulverized animal (or lichen) carbon or equivalent, and then turn on the steam and boil the whole mass for about five minutes, and then filter it through bags or cloth filters. By so doing the relative proportion of carbon, hydrogen, and oxygen is made such as to make the liquid mass a cane-like sugar-liquid; and this completes the second step or degree in my process.

*Third degree.*—This sugar-liquid is then immediately put into a vacuum and steamed down to thirty-three degrees (33°) specific gravity according to Baumé, the test being taken while the sirup is hot. Then I put this sirup into a vat called a "heater," and stir it well until it is in a suitable condition to put into crystallizing-vessels. If the sirup is not quite clear enough, then I run it through flannel or cloth filters before I put it into the heater-vessel. After the crystallizing-vessels are filled with the stirred mass from the heater-vessel, as aforesaid, I put them into a warm room, called the "crystallizing-room," from 75° to 100° Fahrenheit, for the full crystallization of the sugar-mass therein, and allow them to remain there for about thirty hours, and then I take the sugar out of the crystallizing-vessels and put it into coarse linen press-cloths, and press it in a hydraulic or other suitable press until all the sirup remaining in the sugar is pressed out. By so doing I decrease the quantity of hydrogen and oxygen, and thereby approximate more closely a cane-like sugar. The sirup thus pressed out is a merchantable cane-like sirup; and then I take the pressed sugar and melt it over again in the heater-vessel, lined with zinc, by a low steam-heat applied under the zinc lining, and then allow the melted sugar to cool sufficiently to be put into conical molds for crystallization. The conical molds containing the sugar are then put into the crystallizing-room above mentioned and allowed to remain there for about two days, and then the sugar is taken out of the conical molds and put onto gypsum shelves or equivalent for drying in the crystallizing-room. This completes the third and last step in my process, and produces upon an average about sixteen and a half ($16\frac{1}{2}$) pounds of hard, dry cane-like sugar, formula $C^{12}H^{11}O^{11}$, and eighteen (18) pounds of good cane-like sirup, suitable for common and general use, from one bushel of Indian corn or maize. The sirup is that which is pressed from the sugar as above mentioned.

When wheat or other grains containing amylum are subjected to this process instead of Indian corn or maize, they should be used in such quantities that the amount of amylum therein contained equals, or nearly so, the amount of amylum contained in Indian corn or maize, having reference to relative proportions of grain and chemicals.

What I claim as my invention, and desire to secure by Letters Patent, is—

1. The use of animal or lichen carbon and equivalents in the process of making sirup and sugar from Indian corn or maize and other grains before and after neutralization, substantially as set forth.

2. The use of prepared carbonate of quicklime in the manufacture of sirup and sugar from Indian corn or maize and other cereals, substantially as set forth.

3. Pressing the sugar after it has been once crystallized, and remelting it and again putting it into molds for crystallization, substantially as described.

4. The process or method of making sirup and sugar from Indian corn or maize and other cereals containing amylaceous matter, so far as the same is developed in each or either step or degree thereof, substantially as herein described.

5. The manufacture of sirup and sugar from Indian corn or maize and other cereal grains containing amylaceous matter by the process or method substantially as herein described.

6. A cane-like sirup and a cane-like sugar produced from Indian corn or maize or other grains containing amylaceous matter as a new product of manufacture, substantially as set forth.

FREDERICK W. GOESSLING.

Witnesses:
E. B. FORBUSH,
W. E. JILLSON.